(12) United States Patent  
Tariq et al.

(10) Patent No.: US 7,949,746 B1
(45) Date of Patent: May 24, 2011

(54) LOGGING SYSTEM FOR LOGGING OPERATION OF A NETWORK PLATFORM

(75) Inventors: Mohammad Tariq, Olathe, KS (US); Nidal S. Younes, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 718 days.

(21) Appl. No.: 11/743,442

(22) Filed: May 2, 2007

(51) Int. Cl.
  *G06F 15/173* (2006.01)
  *G06F 15/16* (2006.01)
  *G06F 17/30* (2006.01)
  *G06F 11/00* (2006.01)

(52) U.S. Cl. ........... 709/224; 709/203; 707/805; 714/45

(58) Field of Classification Search .......... 709/217–229, 709/250, 318, 200, 203; 370/254; 705/14; 714/26, 45; 707/102, 2
See application file for complete search history.

(56) References Cited

U.S. PATENT DOCUMENTS

| | | | | |
|---|---|---|---|---|
| 6,012,100 A * | 1/2000 | Frailong et al. | ............... | 709/250 |
| 6,769,079 B1 * | 7/2004 | Currey et al. | .................. | 714/45 |
| 2002/0141352 A1 * | 10/2002 | Fangman et al. | ............. | 370/254 |
| 2002/0147645 A1 * | 10/2002 | Alao et al. | ........................ | 705/14 |
| 2002/0198983 A1 * | 12/2002 | Ullmann et al. | ............... | 709/224 |
| 2003/0105884 A1 * | 6/2003 | Upton | ........................... | 709/318 |
| 2004/0107239 A1 * | 6/2004 | Hasegawa et al. | ............. | 709/200 |
| 2005/0251501 A1 * | 11/2005 | Phillips et al. | ..................... | 707/2 |
| 2007/0061397 A1 * | 3/2007 | Gregorat et al. | .............. | 709/203 |
| 2008/0168308 A1 * | 7/2008 | Eberbach et al. | ............... | 714/26 |
| 2008/0189405 A1 * | 8/2008 | Zarenin et al. | ................ | 709/224 |
| 2008/0222186 A1 * | 9/2008 | Cozianu et al. | ................ | 707/102 |

OTHER PUBLICATIONS

Prior Art—Logging Levels (see attached statement).

* cited by examiner

*Primary Examiner* — Ian N Moore
*Assistant Examiner* — Kiet Tang (57) ABSTRACT

A system in which a user (e.g., equipment operator) can readily configure a logging system to log desired information regarding a network platform (e.g., one or more pieces of network equipment), rather than restricting the user to select just one of a plurality of logging levels defined programmatically by the platform manufacturer. The system will provide the user with an interface through which the user can readily define one or more logging levels and, for a given logging level, the particular information that the system is to log. Particular information to be logged may include particular messages that would pass to, from, through, or within the platform, particular parameters of those messages, particular platform status or platform settings, and so forth.

11 Claims, 3 Drawing Sheets

LOGGING SYSTEM FOR LOGGING OPERATION OF A NETWORK PLATFORM

FIELD OF THE INVENTION

The present invention relates to network communications and, more particularly, to logging of network platform operation.

BACKGROUND

With the ever increasing complexity and proliferation of equipment in communication networks, it is often necessary for operators of the equipment to troubleshoot network performance problems. To do so in practice, an operator may invoke or make use of a logging function that logs (e.g., captures and records) information related to operation of the equipment, and the operator may then analyze the logged information in an effort to determine where the problem lies.

A manufacturer of network equipment may program the equipment with the logging function, which may run regularly in the background or may be invoked upon request of the equipment operator. Such a logging function may define various logging levels, with each logging level specifying particular information (e.g., categories of information) to be logged. A lowest logging level may specify that only a rudimentary set of information about the platform will be logged, whereas a highest logging level may specify that virtually every piece of information about the platform that can be logged will be logged. The logging function, possibly with its associated logging levels, may be provided in software or firmware of the equipment, with the software or firmware established by compiling source code written by the equipment manufacturer for instance.

In practice, when the equipment operator invokes the logging function, the equipment may thus execute the compiled code, and the user may select one of the predefined logging levels and direct the equipment to commence logging. The equipment may then engage in the logging process, recording in data storage the pieces of information specified by the selected logging level. Provided with that recorded information, the equipment operator or another entity may then conduct an analysis in an effort to troubleshoot network performance issues.

SUMMARY

A problem with the logging arrangement described above is that the equipment operator is limited to invoke the logging functions specifically predefined by the equipment manufacturer. In some instances, the operator may want to log specific information regarding the network equipment, but the logging levels predefined by the equipment manufacturer may provide either too much information or too little information. If the manufacturer-defined logging levels provide too much information, system resources could be wasted recording the information, and the process of filtering through the logged information to extract relevant information could be overly complex and burdensome. On the other hand, if the manufacturer-defined logging levels provide too little information, the operator may be unable to adequately troubleshoot network performance issues.

The present invention improves upon the existing arrangement, by providing a system in which an end-user (e.g., equipment operator) can readily configure a logging system to log desired information regarding a network platform (e.g., one or more pieces of network equipment), rather than restricting the user to select just one of a plurality of logging levels defined programmatically by the platform manufacturer. In accordance with the invention, the system will provide the end-user with an interface through which the end-user can readily define one or more logging levels and, for a given logging level, the particular information that the system is to log. Particular information to be logged may include particular messages that would pass to, from, through, or within the platform, particular parameters of those messages, particular platform status or platform settings, and so forth.

Ideally, the system would provide the user with a graphical user interface through which the user could readily specify the information to be logged, such as by dragging and dropping items from a list of all possible information. The system may then generate, based on the user's specifications, a configuration file. And the system may then engage in the logging function in accordance with the configuration file, i.e., logging the information specified by the user. That way, the user can conveniently direct the system to log particular information designated by the user, and the user would thus not be restricted to accepting just the log levels and log level definitions programmatically specified by the platform manufacturer.

These as well as other aspects, advantages, and alternatives, will become more apparent to those of ordinary skill in the art by reading the following detailed description, with reference where appropriate to the accompanying drawings.

DETAILED DESCRIPTION

In one respect, an exemplary embodiment of the invention may take the form of a logging system for logging operation of a network platform. The exemplary logging system may include (i) at least one processor, (ii) data storage, (iii) provisioning logic stored in the data storage and executable by the at least one processor to provide a user-interface (e.g., a graphical user interface) through which to receive from at least one user specifications of network platform logging parameters, and (iv) logging logic stored in the data storage and executable by the at least one processor to log (store and/or report) information regarding network platform operation in accordance with the network platform logging parameters specified by the at least one user through the user-interface.

Through use of the inventive system, the user may specify at run-time various network platform logging parameters, defining various information to be logged by the system. Thus, the network logging parameters would not comprise program code written and compiled by the equipment manufacturer or other expert programmer. Thus, the user would not need to be an expert programmer but could instead simply designate the information to be logged, and the logging system could operate in accordance with the user's designations to log that information.

For example, the user may specify a plurality of logging levels, each of which defines a respective set of network platform information to be logged by the logging logic. Thus, the user would not be restricted to logging levels programmatically predefined by the platform manufacturer but could rather define a number of logging levels desired. At each logging level, at least a portion of the set of network platform information to be logged would be defined by specifications of network platform logging parameters received from the user. For instance, the user may define three logging levels and, for each level, the user may specify what particular messages or other information the system is to log (e.g., capture and record). The system may also suggest or provide by default one or more additional pieces of information to be logged at each log level. Further, the system may also suggest or provide by default one or more additional logging levels, aside from any logging levels defined by the user.

In practice, a user may then direct the system to use a particular one of multiple defined logging levels, such as a logging level defined by the user (or by another user), i.e., to direct the system to log network platform information in accordance with the particular logging level. Thus, the provisioning logic of the exemplary system may be executable by the at least one processor to receive from the at least one user a selection of a given one of the logging levels according to which the logging logic should log information regarding network platform information. And the logging logic would then be executable by the at least one processor to log information regarding network platform information in accordance with the given logging level selected by the at least one user.

As another example, a user may specify (e.g., for a particular logging level, or generally) particular messages that the system should log. Thus, the network platform logging parameters received from the at least one user may comprise an indication (e.g., a list, by category or type) of particular messages transmitted within, to, from, or through the network platform. And the logging logic may be executable by the at least one processor to log the particular messages in accordance with those network platform logging parameters. Such messages may include, for instance, Session Initiation Protocol (SIP) messages, Hypertext Transfer Protocol (HTTP) messages, Signaling System # 7 (SS7) messages, ISDN messages, Megaco messages, H.323 messages, or any other types of messages or specific instances of such messages (e.g., SIP INVITE messages, HTTP GET messages) now known or later developed.

Furthermore, the user may specify particular fields of messages that the system should log. Thus, in receiving from at least one user an indication of particular messages to log, the system may receive an indication (e.g., a list, by category or type) of particular message fields, and the logging logic may then be executable by the at least one processor to log the particular messages and values of the particular message fields in accordance with the network platform logging parameters. Examples of message fields include, without limitation, "To" and "From" fields, "Source" and "Destination" address fields, Session Description Protocol (SDP) fields, and other message fields now known or later developed. Optimally, once the system receives a user designation of one or more messages to log, the system may then prompt the user to designate which fields of those messages to log—such as by presenting the user with a list of fields in the designated messages and requesting the user to select desired fields to log.

As yet another example, a user may specify (e.g., for a particular logging level, or generally) particular network platform status information to be logged. Thus, the network platform logging parameters received from the at least one user may comprise an indication of network platform status information to be logged, and the logging logic may be executable by the at least one processor to log status of the network platform in accordance with the network platform logging parameters. Examples of network platform status information include extent of processor usage, numbers of messages handled, occurrences of failure or errors, and other status or system information now known or later developed.

Still further, a user may specify a duration for which the system should carry out the logging function, such as one hour, one day, one week, one month, or any particular time period. Thus, the network platform logging parameters received from the at least one user may comprise an indication of logging duration (perhaps with different a duration for each logging level), and the logging logic may be executable by the at least one processor to log information regarding network platform operation for the indicated logging duration and to then stop logging.

In addition, the logging system may include alarm logic stored in the data storage and executable by the at least one processor to provide (e.g., generate and output, transmit or otherwise emit) at least one platform health alarm, such as when a threshold problem occurs with the network platform. In that case, the provisioning logic may then also be executable to receive from the at least one user a definition of the at least one platform health alarm, such as a definition of one or more threshold conditions or other triggers that should cause the system to generate an alarm. Further, the alarm logic may then be executable by the at least one processor to provide the at least one platform health alarm in accordance with the definition of the at least one platform health alarm received from the at least one user. The definition of the at least one platform health alarm may specify information that is to be presented when the at least one platform health alarm is presented (e.g., by the alarm logic or by a recipient of the alarm). The information to be presented may comprise information such as network platform status information, network platform configuration information, or other platform health information now known or later developed.

The exemplary logging system may be incorporated in the network platform that is being monitored, or it may operate outside of the platform, such as in an entity sitting in a communication path between the platform and one or more other entities, or in a central location in communication with the platform. Further, the network platform that is the focus of the logging function can take any of a variety of forms, examples of which include an Internet Protocol Multimedia System (IMS) platform, a media gateway system, and a web server, among others, including one or more pieces of network equipment in one or more physical locations.

In another respect, and exemplary embodiment of the present invention may take the form of a logging system comprising at least one processor, data storage, provisioning logic, and logging logic. As in the embodiment described above, the provisioning logic may be stored in the data storage and executable by the at least one processor to provide a graphical user-interface through which to receive from at least one user specifications of network platform logging parameters, and the logging logic may be stored in the data storage and executable by the at least one processor to log information regarding network platform operation in accordance with the network platform logging parameters specified by the at least one user through the user-interface.

Further, as in the embodiment described above, the logging parameters may comprise definitions of a plurality of logging levels, each logging level defining a respective set of network platform information to be logged by the logging logic. And at least a portion of each respective set of network platform information may be defined by the specifications of network platform logging parameters received from the at least one user through the user-interface. The provisioning logic may then be executable by the at least one processor to receive from the at least one user a selection of a given one of the logging levels according to which the logging logic should log information regarding network platform information, and the logging logic may be executable by the at least one processor to log information regarding network platform information in accordance with the given logging level selected by the user.

Also as in the embodiment described above, the network platform logging parameters may comprise an indication of particular messages transmitted within, to, from, or through the network platform, including an indication of particular message fields. And the logging logic may then be executable by the at least one processor to log the particular messages, and values of particular message fields, in accordance with the network platform logging parameters.

Further, the network platform logging parameters may comprise an indication of logging duration, and the logging logic may then be executable by the at least one processor to log information regarding network platform operation for the indicated logging duration. And still further, the network platform logging parameters may comprise an indication of network platform status information, and the logging logic may be executable by the at least one processor to log status of the network platform in accordance with the network platform logging parameters.

Yet additionally as in the embodiment described above, the logging system may comprise alarm logic stored in the data storage and executable by the at least one processor to provide at least one platform health alarm. The provisioning logic may then be executable by the at least one processor to receive from the at least one user a definition of the at least one platform health alarm, and the alarm logic may be executable by the at least one processor to provide the at least one platform health alarm in accordance with the definition of the at least one platform health alarm received from the user.

The definition of the at least one platform health alarm may specify information to be presented when the at least one platform health alarm is presented, and the information to be presented may comprise information such as network platform status information and/or network platform configuration information. Further, the user may define alarm severity, such as "Critical", "Major", "Minor", "Information", or "Clear" for instance. Still further, the user may define destinations to which alarms should be sent and manner of sending alarms, such as IP address, domain name, file name, SNMP trap, SMS message, and so forth.

As in the embodiment described above, the particular messages that the user designates to be logged may be SIP messages, HTTP messages, and/or any other messages now known or later developed. And the network platform whose operation is logged may comprise an IMS platform, a media gateway system, a web server, and/or any other network platform now known or later developed.

Figure 1:
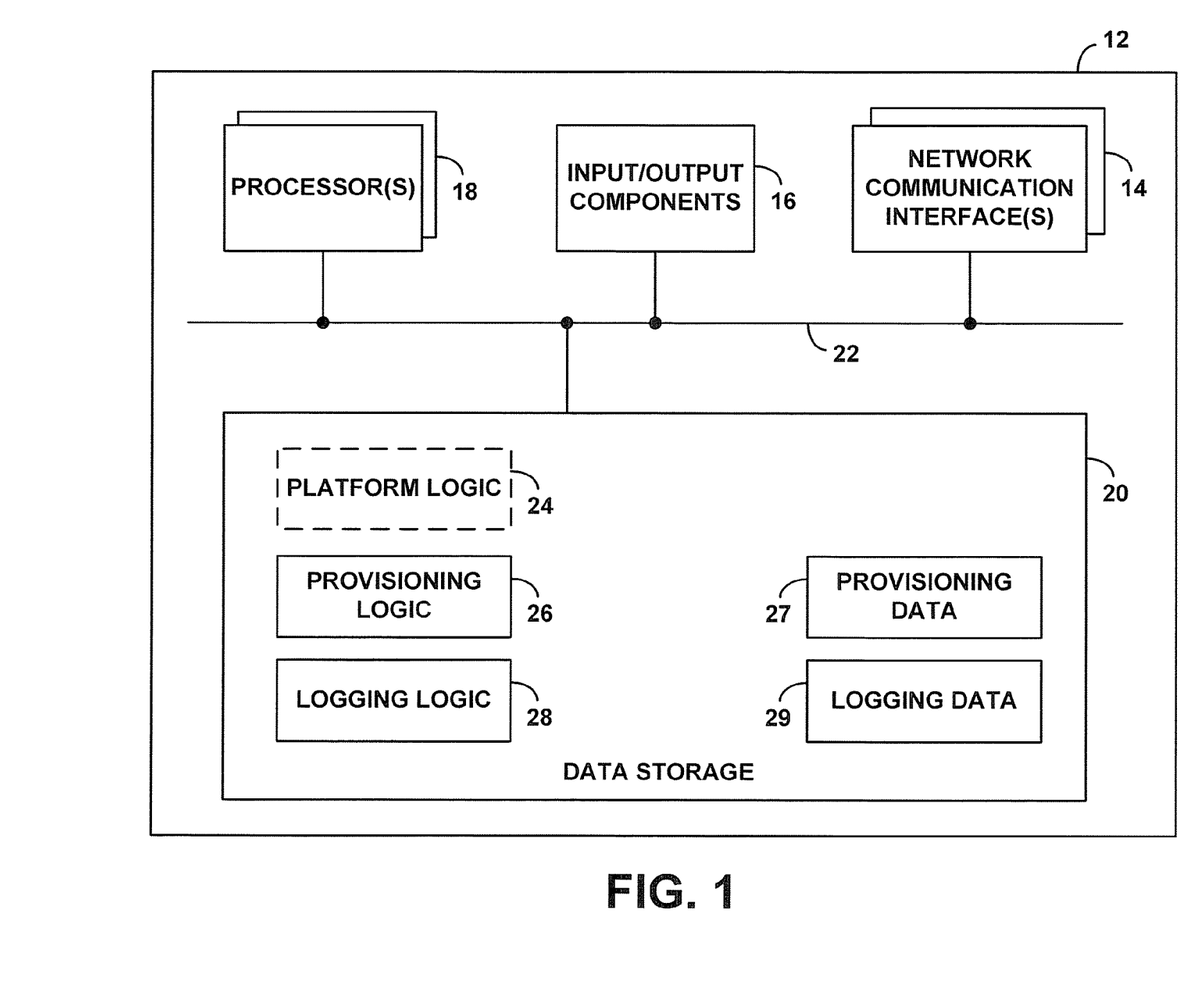
FIG. 1 is a simplified block diagram of an example logging system.

Referring to the drawings, FIG. 1 is a simplified block diagram of a logging system 12 arranged in accordance with the exemplary embodiment. As shown, the exemplary logging system 12 includes a network communication interface 14, input/output components 16, a processor 18, and data storage 20, all of which may be communicatively linked together by a system bus, network, or other connection mechanism 22.

The exemplary logging system 12 may be integrated with the network platform whose operation it functions to log, or it may be provided as a separate network entity. If the logging system 12 is integrated with the network platform, various components shown in FIG. 1 may be components of the network platform, arranged to carry out the inventive functions as well as core functions of the network platform. For instance, processor 18 may comprise one or more host processors of the network platform, and data storage 20 may contain not only program instructions defining core network platform functions but also program instructions defining the inventive provisioning and logging functions.

Further, the components of the logging system 12 as shown in FIG. 1 may be integrated together in an unitary piece of equipment, having a unitary housing made of molded metal, plastic, and/or the like, together with connected peripherals and cables. Alternatively, the logging system may comprise multiple pieces of equipment coupled together to carry out the inventive functions.

Network communication interface 14 may include one or more interfaces for interconnecting the logging system with one or more networks or other communication links. For example, the network communication interface 14 may include an Ethernet module for coupling with a packet-switched network, so that the logging system can send and receive packet-data communications. As another example, the network communication interface may include a telephone line interface circuit for coupling with legacy a public switched telephone network. As still another example, the network communication interface may include a wireless communication interface, such as a Wi-Fi, WiMAX, or cellular wireless communication interface, and the network communication interface may include one or more antennas to facilitate wireless communication. Other examples are possible as well. Aspects of network communication interface 14 may also be provided as software stored in data storage 20 and executable by processor 18. For instance, data storage 20 may include software defining network communication protocol stacks.

Input/output components 16 include one or more components for interfacing with a user, such as to receive input from a user and to provide output to a user. Input/output components 16 may thus include input components such as a keyboard/keypad, a mouse, and/or a touch-sensitive screen, and output components such as a display screen and a sound speaker. Input/output components 16 may also include components to facilitate interfacing with other aspects of logging system 12. For instance, input/output components 16 may include digital/analog conversion circuitry and other components. Further, input/output components 16 may include server software for enabling a user to interact with the logging system 12 from an externally connected computer or terminal running a web browser or other terminal application for instance.

In addition, input/output components 16 may include data defining a graphical user-interface, voice-based user-interface (e.g., VXML interface) or other sort of user-interface through which a user can interact with the logging system, so that the logging system can receive designations of network platform logging parameters from the user and the logging system can present logged data to the user. In accordance with the exemplary embodiment, the user-interface may be defined by provisioning logic of the logging system.

Processor 18 may comprise one or more general purpose processors (e.g., INTEL or AMD microprocessors) and/or one or more special purpose processors (e.g., digital signal processors, application specific integrated circuits, etc.) In turn, data storage 20 may comprise one or more volatile and/or non-volatile storage components, such as magnetic, optical, or organic storage components, which may be integrated in whole or in part with processor 18.

Data storage 20 preferably contains program logic (e.g., machine language instructions) executable by processor 18 to carry out various functions described herein. Further, data storage 20 preferably contains reference data related to the program logic.

In the event logging system 12 is integrated with the network platform whose operation is to be logged, data storage may contain platform logic 24 executable by processor 18 to carry out various functions of the platform. For instance, if the platform comprises a network switch, platform logic 24 may comprise logic executable to carry out various switching functions. In addition, data storage 20 preferably contains provisioning logic 26 and associated provisioning data 27, as well as logging logic 28 and associated logging data 29.

Provisioning logic 26 is preferably executable by the processor 18 to provide a user-interface through which to receive from at least one user specifications of network platform logging parameters. Thus, provisioning data 27 may include user-interface prompts and the like (such as HTML pages for prompting a user to designate network platform logging parameters), and provisioning logic 26 may function to present those user-interface prompts via input/output components 16 to a user, and to receive selections or other designations of network platform logging parameters entered by the user in response to user-interface prompts.

Logging logic 28 is then executable by processor 18 to log information regarding network platform operation in accordance with the network platform logging parameters specified by user through the user-interface. Thus, logging data 29 may include logged information, such as lists of messages that have flowed to, from, within, and/or through the network platform, including values of various fields in the messages, and/or lists of status or configuration information of the platform. Logging data 29 may further include timestamps indicating the time/date when each piece of information was logged. Logging logic 28 may thus be executable to log those pieces of information as logging data 29 in data storage 20. Further, logging logic 28 may be executable to present logged data to a user, through input/output components 16.

Figure 2:
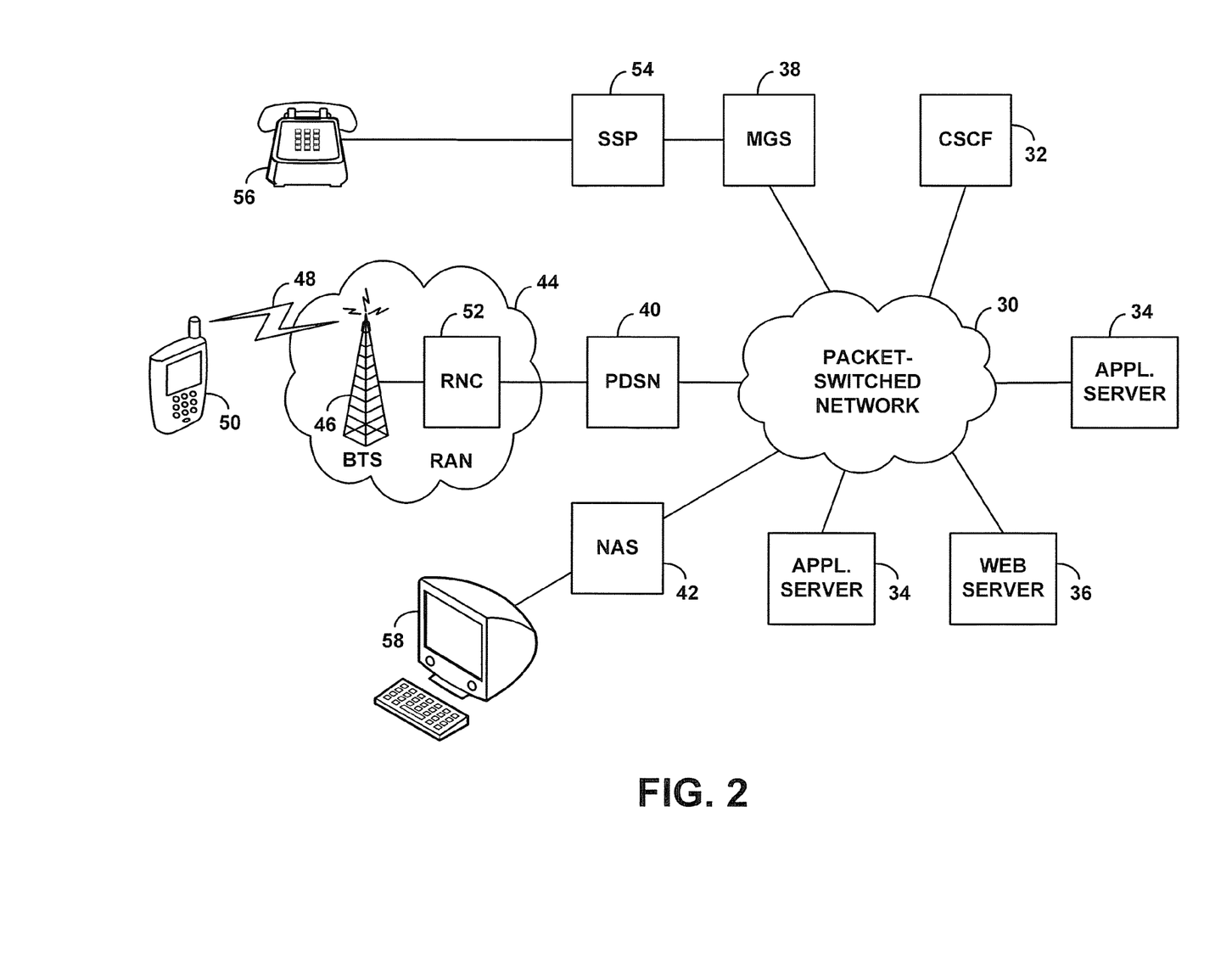
FIG. 2 is a simplified block diagram of a network in which the example logging system can be implemented.

FIG. 2 next depicts a network arrangement in which an exemplary logging system 12 can be implemented. In particular, the figure shows example network platforms whose operation can be logged by the exemplary logging system, and with which the exemplary logging system can be integrated.

The exemplary network arrangement includes a packet-switched network 30 that provides packet-data connectivity between various entities. Shown sitting as example nodes on the packet-switched network 30 are an IMS call session control function (CSCF) 32, various application servers 34, a web server 36, a media gateway system (MGS) 38, a packet data serving node (PDSN) 40, and a network access server 42.

PDSN 40 provides connectivity with a radio access network (RAN) 44 that serves wireless communication devices. RAN 44 includes a base transceiver station (BTS) 46 that radiates to define an air interface 48 through which the RAN communicates with served devices such as a mobile station 50, and a radio network controller (RNC) 52 that controls the BTS 46 and connects with the PDSN 40. Media gateway system 38 provides connectivity with a service switching point (SSP) 54 that serves a legacy telephone 56. And network access server 42 provides connectivity with a computer terminal 58.

CSCF 32 is a core element of the well known IP multimedia subsystem (IMS), which functions to provide enhanced services and management functions for communication sessions. In practice, when a device engages in Session Initiation Protocol (SIP) signaling or other signaling with an application server (such as a call control server for instance), the signaling messages may pass through CSCF 32. In response to receipt of such a message, CSCF 32 may then apply various enhanced services, such as calling out to one or more application servers to invoke particular functions, to change the signaling messages, or to take other actions. For instance, when device 50 sends a SIP "INVITE" message to a call control server, the message may pass to CSCF 32. CSCF 32 may then forward the message to application server 34, which may apply a special service and may possibly change the message, and may then forward the message back to CSCF 32, for transmission to the destination call server. Other examples are possible as well.

Web server 36 functions to deliver web content to client stations finning web browser applications. For instance, device 50 or device 58 may run a web browser application and may engage in HTTP signaling with web server 36 to download web content such as HTML pages or the like. In practice, the client device would send to a network address of the web server an HTTP request message seeking particular web content, and the web server would reply with an HTTP response message carrying the requested web content.

Media gateway system 38 functions to interconnect a packet-switched network with a circuit-switched network, and may include both a media gateway controller and a media gateway. The media gateway controller, also known as a "soft switch," functions to convert between call setup signaling commonly used in the circuit-switched network (such as SS7 signaling for instance) and call setup signaling commonly used in the packet-switched network (such as SIP signaling for instance). The media gateway, in turn, functions to convert between circuit-switched bearer data format (e.g., pulse code modulated data communicated with SSP 54) and packet-switched hearer data format (e.g., real-time transport protocol packets communicated over network 30). Similarly, network access server 42 functions to interconnect a packet-switched network with a circuit-switched network serving client devices, such as computer 58.

As noted above, the exemplary logging system 12 functions to log operation of a network platform. In the arrangement of FIG. 2, the network platform can take various forms, and the logging system 12 can be implemented at various locations. By way of example, the network platform can be the CSCF 32, an application server 34, the web server 36, or the media gateway system 38. As other examples, the network platform can be the PDSN 40, the network access server 42, the SSP 54, the RNC 52, the BTS 46, one of the client stations 50, 56, 58, and/or any other network entity now known or later developed, whether or not shown in the figure. Furthermore, the network platform may comprise any of the communication links shown FIG. 2 or other communication links, and the logging system 12 can function to log messages passing along the communication link.

As further noted above, the logging system 12 may be integrated with the network platform whose operation is to be logged, and/or the logging system 12 may be provided external to the network platform. For example, if the network platform is the CSCF 32, the logging system 12 can be integrated with the CSCF 32, or the logging system 12 can be provided on the link between network 30 and CSCF 32 so that the logging system 12 can monitor and log messages passing to and from the CSCF 32. As another example, if the network platform is the link between application server 34 and the packet-switched network, the logging system 12 can be provided as an intermediary on that link, so that the logging system can monitor and log messages passing through that link. And as yet another example, the logging system 12 could be provided as a centralized entity, such as a node on packet-switched network 30, and the network platform can be programmed to report its operation to the logging system 12 so that the logging system 12 can log the operation.

Figure 3:
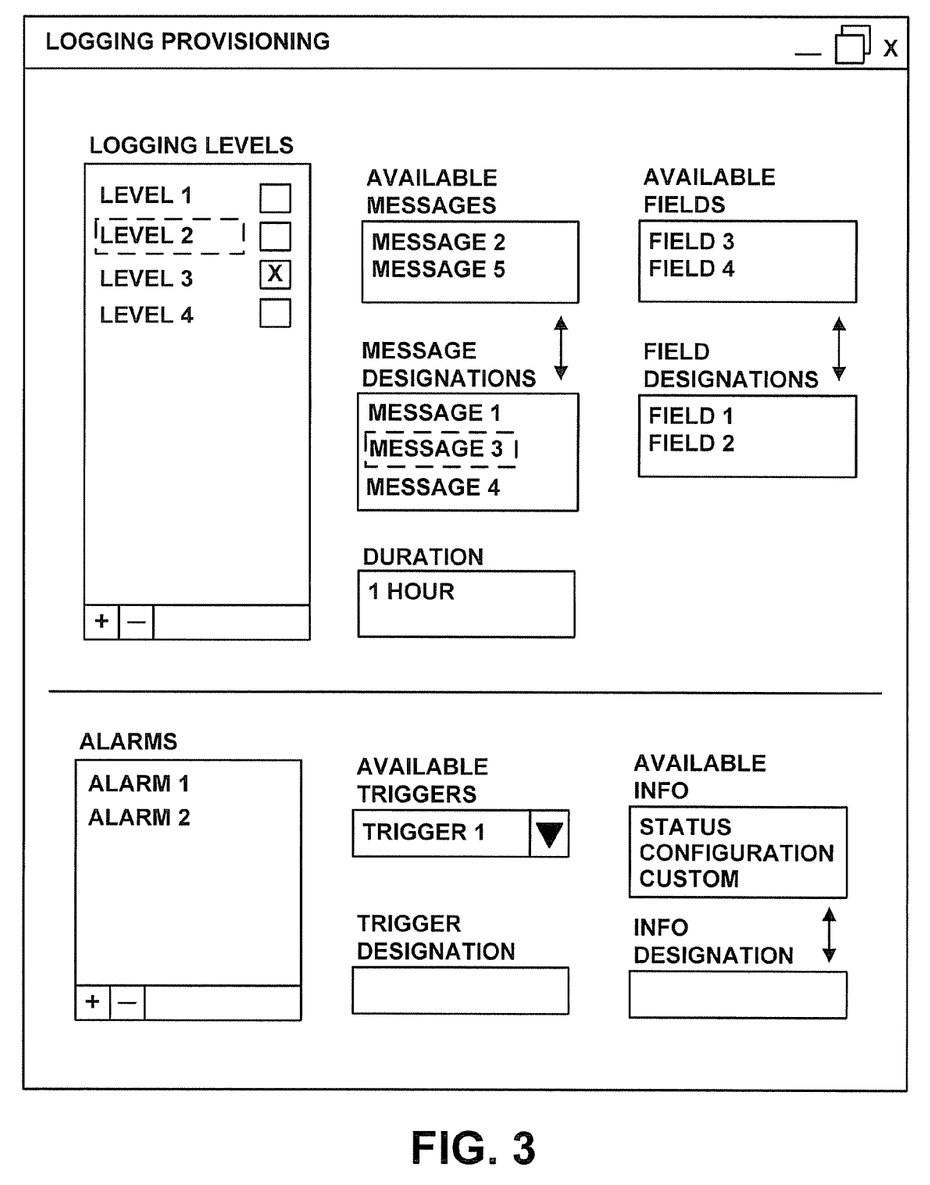
FIG. 3 is an illustration of a graphical user interface through which a user can specify network platform logging parameters.

In accordance with the exemplary embodiment, as described above, the logging system 12 will provide a user-interface through which a user can interact with the logging system at run-time to designate network platform logging parameters according to which the logging system 12 will log platform operation. FIG. 3 depicts an example graphical user interface (GUI) that the logging system 12 may provide to a user via input/output components 16 for this purpose. As shown in FIG. 3, the example GUI provides a mechanism for the end-user (e.g., platform operator) to define one or more logging levels and one or more alarms.

In one section, the GUI provides a "logging-levels" creation box, through which a user can add or remove logging levels by clicking on a plus or minus sign. Clicking on the plus sign enables a text entry field in which the user can enter the name of a new logging level (all shown generically in the figure as "LEVEL" followed by a numerical index). When a given logging level is highlighted, the GUI then provides the user with boxes in which the user can designate messages and message fields to be logged at that log level. In particular, the GUI provides a list of all available messages (e.g., all messages that the platform is programmed to handle), and the user may select desired messages by double-clicking on the messages, so that the selected messages then appear in a message-designations box. In turn, when a given message is highlighted in the message-designations box, the GUI provides a list of the fields of that message, and the user may select desired message fields whose values are to be logged, by double-clicking on the desired fields, so that the fields then appear in a field-designations box.

In addition, for a given logging level, the GUI provides a "duration" box in which the user may enter a logging duration, so that the logging system 12 will log network platform operation for the indicated duration when directed to log in accordance with that logging level. Although not shown, the GUI may also provide mechanisms for the user to designate other network platform logging parameters, such as indications of network status, configuration, or the like, and perhaps indications of the frequency at which such information should be logged. Other examples are possible as well.

Still further, for the various logging levels, the GUI provides checkboxes or option buttons selectable by the user to designate one or more currently active logging levels. For instance, as shown in the logging-levels box, the GUI may provide a checkbox next to each defined logging level, and the user may check one of the boxes to indicate that the corresponding logging level is active. In the active mode, the logging system 12 will log network platform operation in accordance with the logging level definition established by the user, recording logging data in data storage 20 for later presentation and analysis.

In another section, the GUI provides an "alarms" creation box, through which a user can similarly add or remove alarms by clicking on a plus or minus sign. Clicking on the plus sign enables a text entry field in which the user can enter the name of a new alarm. When a given alarm is highlighted, the GUI then provides the user with boxes in which the user can designate triggers for the alarms, as well as information to be presented or otherwise included in the alarms. In particular, the GUI provides a drop-down box listing various triggers selectable by the user, and when the user selects a desired trigger, a name of the trigger appears in a trigger-designation box. Further, the GUI provides an available-information box listing information about the network platform (such as status and configuration information) that can be presented in an alarm, and the user may select desired information by double-clicking on the information, so that the selected information then appears in a information-designations box. As further shown, a "custom" selection may be provided as well, to allow the user to create or select custom alarm text or other media to be presented. In addition, other user-interface elements can be provided to allow the user to define alarm thresholds, such as indications of how many network events need to occur before an alarm is generated, and so forth.

It should be understood that the GUI shown in FIG. 3 is an example only, and that the user-interface through which a user designates network platform logging parameters in accordance with the exemplary embodiment can take any of a variety of other forms. For example, the user-interface may comprise a more rudimentary command-line interface through which the user can enter commands to designate network platform logging parameters. And as another example, a text based editable file may be used to define the logging parameters.

In operation, as the user defines network platform logging parameters, the logging system 12 may create a configuration file (provisioning data 28) specifying the network platform logging parameters. For instance, the logging system 12 may create an XML file that lists various messages, message fields, and other logging parameters designated by the user. The logging system may then log network platform operation in accordance with the parameters in that file.

By way of example, if the logging system 12 is provided to log operation of CSCF 32, a user (such as telecommunication service provider or other operator of CSCF 32) may interact with the GUI of FIG. 3 to define various logging levels and, for each logging level, particular SIP messages and fields of those SIP messages to be logged, as well as other information to be logged. The logging system 12 may then log the information designated by the user at an active logging level.

As another example, if the logging system is provided to log operation of web server 36, a user (such as a web service provider) may interact with the GUI of FIG. 3 to define various logging levels and, for each logging level, particular HTTP messages and fields of those HTTP messages to be logged, as well as other information to be logged. The logging system 12 may then log the information designated by the user at an active logging level.

And as another example, if the logging system is provided to log operation of media gateway system 38, a user (such as a telecommunication service provider) may interact with the GUI of FIG. 3 to define various logging levels and, for each logging level, particular SS7 messages, Megaco messages, ISDN messages, H.323 messages, and SIP messages and fields of those messages to be logged, as well as other information to be logged. The logging system 12 may then log the information designated by the user at an active logging level. Other examples are possible as well.

An exemplary embodiment of the invention has been described above. Those skilled in the art will appreciate, however, that many changes from the foregoing description are possible while remaining with the scope of invention as claimed.

We claim:

1. A logging system for logging operation of a network platform, the logging system comprising:
   at least one processor;

data storage;

provisioning logic stored in the data storage and executable by the at least one processor to provide a user-interface through which to receive at run time, from at least one user, specifications of network platform logging parameters;

logging logic stored in the data storage and executable by the at least one processor to log information regarding network platform operation in accordance with the network platform logging parameters specified by the at least one user through the user-interface; and alarm logic stored in the data storage and executable by the at least one processor to provide at least one platform health alarm, wherein the network platform logging parameters comprise definitions of a plurality of logging levels, each logging level defining a respective set of network platform information to be logged by the logging logic, wherein at least a portion of each respective set of network platform information is defined by the specifications of network platform logging parameters received from the at least one user through the user-interface, wherein the provisioning logic is further executable by the at least one processor to receive from the at least one user a selection of a given one of the logging levels according to which the logging logic should log information regarding network platform operation, and wherein the logging logic is further executable by the at least one processor to log information regarding network platform operation in accordance with the given logging level selected by the at least one user, wherein the provisioning logic is further executable by the at least one processor to receive from the at least one user a definition of the at least one platform health alarm, and the alarm logic is executable by the at least one processor to provide the at least one platform health alarm in accordance with the definition of the at least one platform health alarm received from the user, and wherein the definition of the at least one platform health alarm specifies information to be presented when the at least one platform health alarm is presented, wherein the information to be presented comprises information selected from the group consisting of network platform status information and network platform configuration information.

2. The logging system of claim 1, wherein the logging logic is executable by the at least one processor to log information regarding network platform operation by storing the information in the data storage for later use or reference.

3. The logging system of claim 1, wherein the network platform logging parameters comprise an indication of network platform status information, and wherein the logging logic is executable by the at least one processor to log status of the network platform in accordance with the network platform logging parameters.

4. The logging system of claim 1, wherein the network platform logging parameters comprise an indication of logging duration, and wherein the logging logic is executable by the at least one processor to log information regarding network platform operation for the indicated logging duration.

5. The logging system of claim 1, wherein the network platform comprises a platform selected from the group consisting of an Internet Protocol Multimedia System (IMS) platform, a media gateway system, and a web server.

6. The logging system of claim 1, wherein the network platform logging parameters do not comprise program code that needs to be compiled in order to be used by the logging logic.

7. A logging system for logging operation of a network platform, the logging system comprising:

at least one processor;

data storage;

provisioning logic stored in the data storage and executable by the at least one processor to provide a graphical user-interface through which to receive from at least one user, at run time, specifications of network platform logging parameters;

logging logic stored in the data storage and executable by the at least one processor to log information regarding network platform operation in accordance with the network platform logging parameters specified by the at least one user through the user-interface; and alarm logic stored in the data storage and executable by the at least one processor to provide at least one platform health alarm, wherein the logging parameters comprise definitions of a plurality of logging levels, each logging level defining a respective set of network platform information to be logged by the logging logic, and wherein at least a portion of each respective set of network platform information is defined by the specifications of network platform logging parameters received from the at least one user through the user-interface, wherein the provisioning logic is further executable by the at least one processor to receive from the at least one user a selection of a given one of the logging levels according to which the logging logic should log information regarding network platform operation, and wherein the logging logic is executable by the at least one processor to log information regarding network platform operation in accordance with the given logging level selected by the user, wherein the network platform logging parameters comprise an indication of particular messages transmitted within, to, from, or through the network platform, wherein the logging logic is executable by the at least one processor to log the particular messages in accordance with the network platform logging parameters, wherein the indication of particular messages comprises an indication of particular message fields, wherein the logging logic is executable by the at least one processor to log the particular messages and values of the particular message fields in accordance with the network platform logging parameters, wherein the network platform logging parameters comprise an indication of logging duration, and wherein the logging logic is executable by the at least one processor to log information regarding network platform operation for the indicated logging duration, wherein the provisioning logic is further executable by the at least one processor to receive from the at least one user a definition of the at least one platform health alarm, and the alarm logic is executable by the at least one processor to provide the at least one platform health alarm in accordance with the definition of the at least one platform health alarm received from the user, and wherein the definition of the at least one platform health alarm specifies information to be presented when the at least one platform health alarm is presented, wherein the information to be presented comprises information selected from the group consisting of network platform status information and network platform configuration information.

8. The logging system of claim 7, wherein the network platform logging parameters comprise an indication of network platform status information, and wherein the logging logic is executable by the at least one processor to log status of the network platform in accordance with the network platform logging parameters.

9. The logging system of claim 7, wherein the particular messages comprise messages selected from the group consisting of Session Initiation Protocol (SIP) messages, Hypertext Transfer Protocol (HTTP) messages, Signaling System #7 (SS7) messages, ISDN messages, Megaco messages, and H.323 messages.

10. The logging system of claim 7, wherein the network platform comprises a platform selected from the group consisting of an Internet Protocol Multimedia System (IMS) platform, a media gateway system, and a web server.

11. The logging system of claim 1, wherein the user-interface comprises a graphical user interface.

* * * * *